United States Patent [19]

Stevenson

[11] 4,252,762
[45] Feb. 24, 1981

[54] METHOD FOR PRINTING AND DECORATING PRODUCTS IN A ROTOMOLDING PROCESS

[76] Inventor: Michael J. Stevenson, 945 S. Laurel St., Santa Ana, Calif. 92704

[21] Appl. No.: 971,925

[22] Filed: Dec. 21, 1978

[51] Int. Cl.³ .......................... B29C 5/04; B29F 5/00
[52] U.S. Cl. .................................. 264/126; 264/245; 264/255; 264/310; 264/338
[58] Field of Search ............... 264/310, 245, 255, 126, 264/DIG. 60, 246, 250, 247, 338, 294, 296

[56] References Cited

U.S. PATENT DOCUMENTS

| | | | |
|---|---|---|---|
| 2,855,631 | 10/1958 | Rowley | 264/DIG. 60 |
| 3,079,644 | 3/1963 | Molitor et al. | 264/310 |
| 3,246,069 | 4/1966 | Maynord | 264/310 |
| 3,796,622 | 3/1974 | Brody | 264/245 |
| 3,923,941 | 12/1975 | Weaver | 264/73 |
| 4,158,689 | 6/1979 | Pett et al. | 264/126 |

*Primary Examiner*—W. E. Hoag
*Attorney, Agent, or Firm*—Robert E. Strauss

[57] ABSTRACT

There is disclosed a method for the imprinting and decorating rotomolded products. The method comprises the application to the interior surfaces of the mold of a viscous suspension of pigment in a preselected pattern. The suspension is applied to the mold surface in an oil carrier using a vegetable, animal or mineral oil that is inert under the molding conditions and that has a sufficient viscosity at the molding conditions to maintain the film on the mold surfaces. The pattern of the pigment suspension is applied by spraying, brushing, screen printing and the like and, after its application, the conventional rotomolding can be practiced. In this method, the powdered plastic, typically high density polyethylene, in powder form is charged to the mold, the mold is closed and placed in an oven heated to from 500° F. to about 800° F. while rotating the mold along two axes, to tumble the plastic powder against the heated side of the mold where the powder consolidates into an integral molded wall of a plastic shape. The invention provides a very high line or character definition preferably using finely subdivided pigments.

19 Claims, 5 Drawing Figures

METHOD FOR PRINTING AND DECORATING PRODUCTS IN A ROTOMOLDING PROCESS

BACKGROUND OF THE INVENTION

The formation of molded products, typically hollow form products by rotational molding is widely practiced. Colored products have been formed by incorporating a pigment in the powdered plastic that is charged to the molds and the subsequent tumbling of the molds in a heated oven along two axes thoroughly incorporates the pigment throughout the molded product. This procedure, however, can only be used to produce a single colored product and decorative trim and/or printed matter cannot be imparted to the product by this procedure.

By far, the most prevalent plastic used for rotomolding is polyethylene, usually high density polyethylene. This material is extremely resistent to accepting printed matter or decoration, usually requiring some pretreatment such as flame oxidation and the like to render the surface receptive to colored paints, inks and the like. Other methods have been to apply decoration and printed matter to the molded surfaces in the form of adhesive decals and the like.

Although rotomolding is known and has been practiced for many years, no technique has yet been developed for imparting printed matter and decoration to the surface of rotomolded products during the rotational molding procedure. The rotational molding procedure briefly comprises charging the powdered plastic to a metal mold which is closed and supported on an arm for rotation about two major axes. The mold is placed inside an oven and heated therein to molding temperatures, typically from 500° F. to about 800° F. while it is rotated about two major axes, tumbling the powdered plastic against the heated interior mold surfaces where the powders adhere and collesce into an integral product. Methods for imprinting or decorating the surfaces of the molded product have, heretofore, been believed to be inapplicable to rotomolding because of the random mixing and tumbling of the polymer particles and pigment within the mold during the molding step. Consequently, no technique has heretofore been developed for achieving a molded pattern of printed characters or decoration in the surfaces of rotomolded products.

BRIEF DESCRIPTION OF THE INVENTION

This invention comprises imparting a molded pattern of printed characters, decoration and the like in the surfaces of rotomolded products. The method is employed during the rotomolding process and briefly comprises precoating the interior surfaces of the mold cavity with a thin coating of an oil suspension of pigments. The coating can be applied to the interior mold surfaces by brushing, spraying, screen printing and the like to deposit a thin coating of the oil suspension of pigment. The coating thickness is no greater than about 0.005 inch and the oil has a sufficient viscosity, typically greater than about 80 Saybolt seconds at 100° F. to insure that the layer does not migrate or drain from the surface after its application. The oil suspension of pigment is applied to the surface in one or more treatments as required to deposit single or multiple colors desired for the appearance of the finished product. After application of the oil-pigment suspension, the mold cavity is charged with powdered plastic, typically with high density polyethylene, the cavity is closed by joining the halves of the mold and conventional rotomolding techniques are employed to obtain the molded product.

BRIEF DESCRIPTION OF THE DRAWINGS

The invention will be described with reference to the FIGURES of which.

DESCRIPTION OF PREFERRED EMBODIMENTS

Figure 1:
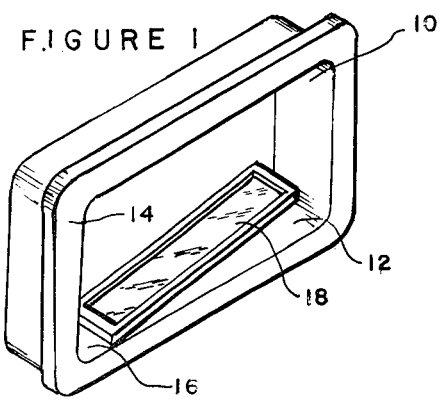
FIG. 1 illustrates the positioning of a stencil or silkscreen in a mold cavity.

The invention is applied to the application of printed matter or decoration on the exterior surfaces of rotomolded products. The method can be practiced with a conventional mold used in rotomolding. These molds are commonly formed of mold halves such as mold 10 having a mold cavity 12 and a front flange 14. The mold itself can have irregular contours and configuration; for simplification a simple rectangular-cavity mold is illustrated. In the application, the surface of the product which is formed against the sidewall 16 is to be provided with an artistic illustration or printed matter. A stencil, screen print and the like 18 is placed against surface 16 as illustrated in FIG. 1. This transfer pattern has decorative or printing portions 18. The invention can be applied to molds without any pretreatment and without prior coating with a parting agent.

Screen printing is the preferred method for application of decorative or printed matter to the mold. The screen printing method is used as conveniently practiced using a finely woven bolting cloth, although Nylon, Dacron or wire mesh of phosphor bronze or Monel are also applicable. The screen has been prepared in advance in accordance with the conventional practice by indirect or direct photographic methods or by a lacquer film stencil method.

Figure 2:
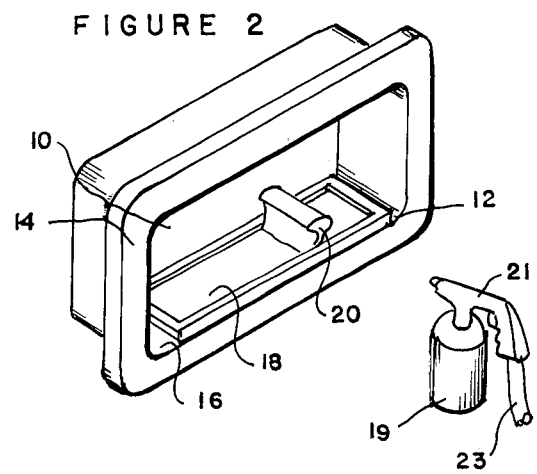
FIG. 2 illustrates the application of the pigment oil suspension.

Referring now to FIG. 2, the screen 18 is in position in the mold cavity 12, secured against surface 16. The pigment oil suspension is applied on the surface of the screen and is worked through the open portions of the weave of the screen using a conventional squeezie 20, roller or other tool for transferring the pigment and suspension.

Figure 3:
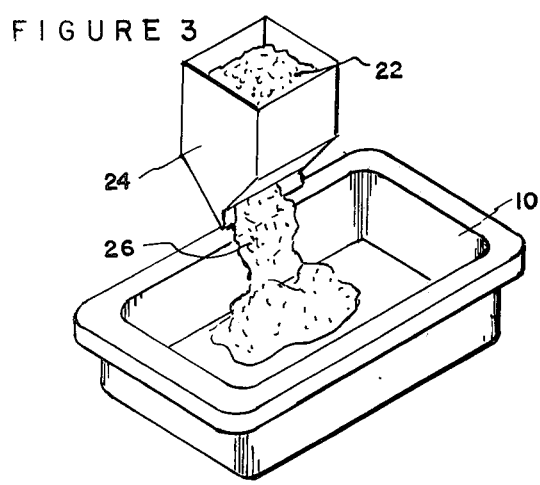
FIG. 3 illustrates loading of the mold cavity with the powdered plastic.
Figure 4:
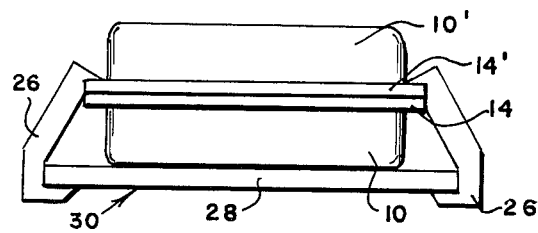
FIG. 4 is a side view of the closed mold used in the rotomolding procedure.
Figure 5:
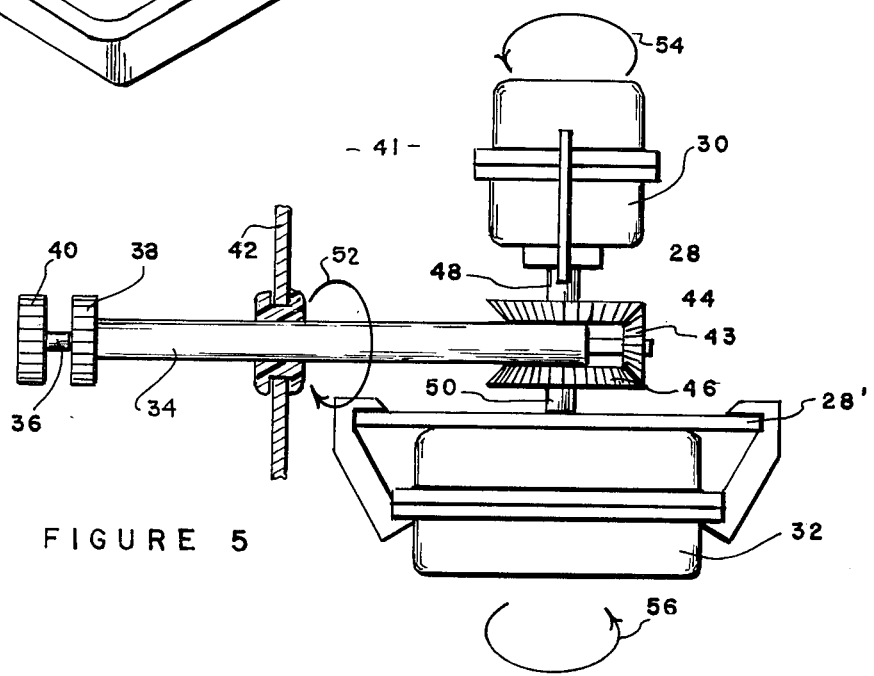
FIG. 5 illustrates rotomolding of the product.

After the pigment oil suspension has been applied to the desired interior surfaces of the mold 10, the screen is removed and the mold is charged with the powdered polymer as shown in FIG. 3. The powdered polymer can be charged to the mold immediately while the pigment oil suspension is still wet or in liquid film form. The powdered polymer 22 is supplied from a hopper or dispenser 24 and the charge 26 of the polymer is loosely received within the cavity of the mold half 10. The rotomolding process conventionally uses powdered high density polyethylene, powdered polycarbonates, nylons, low density polyethylenes and acetels have also been employed in some applications. The printing or decorating method of this invention can be applied to these polymers or to any other polymers which can be molded in rotomolding process, care being exercised only to insure that the pigments employed are compatible with the particular polymer being molded. The polymer powders typically are of a size range passing a 30 mesh, U.S. Standard size screen. Conventional size ranges, which are useful herein, are from 30 to 35 mesh and 50 to 60 mesh, for the powdered polymer. These two sizes are most commonly available and are preferred for that reason. Other sizes can be used, as desired, or necessary for the desired rotomolding.

After the powdered polymer is charged to the mold, the mold halves 10 and 10' are assembled by securing their flanges 14 into butting engagement. The mold halves are clamped together by suitable clamps such as 26 and are secured to a supporting plate 28.

The rotomolding method is practiced by positioning the assembled molds 30 and 32 on a rotating arm assembly. The arm assembly comprises a first rotatable shaft 34 which receives a second concentric rotatable shaft 36. The shafts are provided with driven gears 38 and 40 carried by shafts 34 and 36, respectively. The rotatable arm assembly projects through a wall 42 of a heated enclosure, typically an oven and terminates therein. The shaft 36 distally bears a bevel gear 42 which engages a pair of bevel gears 44 and 46 that are rotatably mounted on stub shafts carried by shaft 34. The gears 44 and 46 are secured to stub shafts 48 and 50 that are secured to the supporting plates 28 and 28' of the mold assemblies.

In the rotomolding process, the oven enclosure 41 is heated to a temperature from about 500° F. to about 800° F., preferably from 600° F. to about 700° F., and the molds and arm assembly is slowly rotated about the axis of the arms 34 and 36 as shown by the solid arrowhead line 52 while each of the mold cavities are rotated about the axes of the stub shafts 48 and 50 as shown by the solid arrowhead lines 54 and 56. Typical rotational speed employed are from 6 to about 10 revolutions per minute, usually about 5 to about 30 revolutions per minute. As known in this process, the speed of rotation depends greatly upon the product, its size, and its wall thickness, also the materials to be used. The rotational speed of shafts 34 and 36 can be independently controlled to control the tumbling action of the powdered polymer within the mold cavities, and thereby provide variations in wall thicknesses of different portions of the molded product.

The invention can be applied to the multiple applications of different colors by applying a layer of the powdered polymer over each application of the oil-pigment suspension. In this procedure, the stencil for the first color is applied, the oil and pigment suspension is worked through the stencil and onto the mold surface, the stencil is removed, powdered polymer is then sprinkled over the applied area and any excess powder is removed by blowing the area with air or tapping the mold. The powdered polymer has been found to adhere to the coated portions of the mold surface which bear the oil and pigment suspension. Thereafter, the stencil for the second color is applied over the surface, giving care not to disturb the first layer of color, the oil-pigment suspension for the second color is worked through the stencil, the stencil is removed and the newly covered areas are again covered with the powdered polymer. This can be repeated in as many times as desired to provide a multiple color pattern on the product. It is preferred in this application that the smallest colored area which is within or overlayed by larger areas be applied with the first stencil and that the successively larger color patterns be applied with successive stencils. The oil-pigment suspensions employed in the invention do not exhibit any migration or mixing even with multiple color applications and the intermediate polymer barrier that is applied as a powder over the color effectively masks the areas between the color layers.

The oil pigment suspension is applied with a film thickness of from about 0.001 to about 0.0075, preferably from about 0.003 to about 0.005 inch. The thickness of the film applied should be maintained less than the thickness that would drain from the surface of the mold when the mold is at a heated condition in the rotomolding oven.

The pigments which are employed for the oil pigment suspension are preferably inorganic pigments which are compatible with the particular polymer used in the rotomolding process. Organic pigments and dyes can also be used, however, their use is limited to applications where color bleeding will not cause any problems, e.g., when very sharp resolution is not required. The most suitable pigments are inorganic pigments which comprise oxides of metals such as chromium, antimony, nickel, titanium, zinc, iron, nickel, aluminum, cobalt, silicon, copper, etc., as well as the phosphates of metals such as cobalt and the sulfides and selenides of metals such as cadnium, etc. The following table summarizes the colors and corresponding metal oxides which can be used as the pigment:

TABLE

| Color | Metal Compounds* |
| --- | --- |
| Green | Cobalt, Nickel, Titanium and Zinc |
| Green | Chromium and Cobalt |
| Black | Iron, Manganese and Copper |
| Black | Chromium and Copper |
| Purple | Cobalt and Lithium Phosphates |
| Purple | Cobalt Phosphate |
| Blue | Aluminum, Cobalt and Zinc |
| Blue | Cobalt, Zinc and Silica |
| Tan | Zinc and Iron |
| Bright Yellow | Nickel, Columbia and Titanium |
| Red | Cadnium Sulfide and Selenide |
| Bright Yellow | Cadnium Sulfide |
| Brown | Chromium, Iron and Zinc |
| Light Yellow | Nickel and Titanium |
| Medium Yellow | Nickel, Antimony and Titanium |
| Gold | Titanium, Antimony and Chromium |
| Buff | Chromium, Antimony, Nickel and Titanium |

*Designated as oxides unless otherwise specified.

The aforementioned colors can be provided in varied shades by the addition of from 0.5 to about 2 parts by weight of titanium dioxide per part by weight of the pigment.

The aforementioned pigments are preferably employed in a finely ground or subdivided condition. The pigments are commercially available with the majority passing a 325 U.S. Standard screen typically with no more than about 1 weight percent retained by the screen. While this size range is satisfactory for many applications, it has been observed that in some applications, the colored areas do not present a homogeneous surface to the eye and that the eye can discriminate some unpigmented areas between the pigment particles in the finished product. Accordingly, it is desired for fine work that the particle size of the inorganic pigments employed have an average diameter less than about 1 micron. There is no limit on the smallest particle average diameter, however, the work required for subdividing the particles increases exponentially with the subdivision and it is, therefore, desirable to maintain the particles as large as possible for obtaining the desired homogeneous appearance. Accordingly, particles having diameters from about 0.1 to about 1 microns constitute a most preferred category of pigments. Pigments which are available in this degree of subdivision are marketed under a cosmetic grade designation.

The oil which is employed to suspend the particles can comprise any oil of vegetable, animal or mineral origin. The oil should be clear, i.e., of a light color or of water white appearance and should have a viscosity from about 100 to about 500 Saybolt Universal, preferably from about 180 to about 195 Saybolt Universal. The oil should be inert at temperatures up to about 500° F. for a period of time of up to about 10 minutes in an air atmosphere to insure against degradation, such as oxidation or polymerization and the like during the rotomolding process. Examples of suitable oils falling within the aforementioned description are the following vegetable oils: castor oil, corn oil, soybean oil, cottonseed oil and sunflower seed oil. Examples of animal origin oil include: cod liver oil, sperm oil and lard; and examples of mineral oils include: mineral oil and motor oils.

The pigment is employed in the oil suspension at a concentration sufficient to provide the desired pigment opacity for a film of up to about 0.005 inch thickness. Typically, this concentration is from 25 weight percent to about 75 weight percent; preferably from about 50 weight percent to about 75 weight percent is employed. The actual concentration can vary somewhat, depending upon the particular mixture of pigments employed and the presence or absence of a whitening pigment such as titanium dioxide. The actual concentration can be evaluated in a simple test procedure wherein the suspension is applied to an aluminum plate which is dusted with the polymer powder, e.g., powder of high density polyethylene and placed in an oven maintained at a temperature of from about 300° to 500° F., for sufficient time to mold the powder into an integral sheet. The sheet is removed from aluminum plate and the pattern of the color marking is inspected.

Other materials which can also be dispersed in the oil suspension include small substantially spherical particles of the molding plastic. These are commercially available and are known to the trade as microspheres, typically with a size having average particle diameters from 1 to about 20 microns. These can be included at concentrations from 5 to about 35 weight percent of the suspension to enhance the color dispersion and to increase the depth of the color layer.

Another group of additives are the known ultraviolet light screening and absorbers such as carbon black; benzophenones, e.g., 2,2'-dihydroxy-4-methoxy-benzophenone; benzotriozoles, e.g., 2,2'-hydroxy-3' methylphenyl-benzotriazole; resorcinol monobenzoate; barium metaborate, etc. These are available in finely powdered form passing a 325 mesh screen and can be used at concentrations from 0.5 to about 10 weight percent in the suspension. The surface application of these additives by the invention imparts the desired ultra-violet light resistance without any lessening of the polyemr strength which otherwise occurs when these agents are incorporated into the entire polymer matrix.

The preceding description of the preferred embodiment of the invention is intended solely to illustrate the presently preferred modes of practice. It is not intended that the invention be unduly limited by this description of specific examples. Instead, it is intended that the invention by defined by the method steps, and the reagents, set forth in the following claims.

What is claimed is:

1. The method for decorating and printing the surface of a rotomolded plastic product which comprises, in the following sequence:
   (a) applying a pattern onto a preselected portion of the interior surface of a mold to be used in a rotomold process as a coating of a pigment-oil suspension consisting essentially of a coloring agent selected from the class consisting of organic and inorganic pigments and dyes in an oil having a clear coloration and a viscosity from about 100 to about 500 Saybolt Universal seconds and inert under the conditions of rotomolding including temperatures up to about 500° F. and times up to about 10 minutes in an air atmosphere, to provide a pattern of a liquid film of said pigment-oil suspension with a thickness up to about 0.005 inch; and
   (b) charging powdered polymer to said mold bearing said liquid film, inserting the mold in a heating means, and conducting the rotomolding of the product with heating to coalesce said particles and recovering therefrom a product having a decorative or printed pattern appearing on the aforesaid preselected area of its exterior surface.

2. In a rotomolding process wherein a mold is charged with powdered polymer, closed, inserted in a heating means and heated therein to coalesce the particles of said powdered polymer into a molded product, the improvement which comprises a method for decorating and printing the surface of the rotomolded product by applying a pattern onto a preselected portion of the interior surface of said mold before charging said powdered polymer as a coating of a pigment-oil suspension consisting essentially of a coloring agent selected from the class consisting of organic and inorganic pigments and dyes in an oil having a clear coloration and a viscosity from about 100 to about 500 Saybolt Universal seconds and inert under the conditions of rotomolding including temperatures up to about 500° F. and times up to about 10 minutes in an air atmosphere, to provide said pattern as a liquid film of said pigment-oil suspension with a thickness up to about 0.005 inch.

3. The method for decorating and printing the surface of rotomolded plastic products which comprises, in the following sequence:
   (a) preparing a pigment-oil suspension consisting essemtially of a coloring agent selected from the class consisting of organic and inorganic pigments and dyes in an oil having a clear coloration and a viscosity from about 100 to about 500 Saybolt Universal seconds and inert under conditions including temperatures up to about 500° F. and times up to about 10 minutes in an air atmosphere;
   (b) applying a pattern onto a preselected portion of the interior surface of a mold to be used in the rotomold process as a coating of the aforesaid pigment-oil suspension to provide a pattern of a liquid film of said pigment-oil suspension with a thickness up to about 0.005 inch; and
   (c) charging powdered polymer to said mold bearing said liquid film, inserting the mold in a heating means, and conducting the rotomolding of the product with heating to coalesce said particles and recovering therefrom a product having a decorative or printed matter appearing on the aforesaid preselected area of its exterior surface.

4. The method of claim 1 wherein said powdered polymer is selected from the class of polyethylene, Nylon, polyvinylchloride and polycarbonate.

5. The method of claim 3 wherein said oil has a viscosity from about 180 to 195 Saybolt Universal seconds.

6. The method of claim 1 wherein said pattern is applied through a silk screen stencil.

7. The method of claim 1 wherein a multiple color decorative or printed pattern is imparted to the rotomolded product by the method of sequential application of a plurality of patterns, applying a sequence of different colored pigments in said pigment-oil suspension and, between each application of said suspensions, covering the resultant pattern on the surface of the mold by a thin coating of said powdered polymer.

8. The method of claim 1 wherein said pigment is used at a concentration of 25–75 weight percent of said pigment-oil suspension.

9. The method of claim 8 wherein said pigment is used at a concentration of 50–75 weight percent.

10. The method of claim 1 wherein said thin coating of powdered polymer is formed by applying powdered polymer over said resultant pattern, removing excess, non-adhering powdered polymer and therafter applying the succeeding pattern.

11. The method of claim 10 wherein a single step of rotomolding is practiced after said sequential application of said plurality of patterns.

12. The method of claim 1 wherein said pigments are powders substantially all passing a 325 mesh screen.

13. The method of claim 12 wherein said pigments are powders having particle diameters from about 0.1 to 1 micron.

14. The method of claim 1 wherein said powdered polymer is polyethylene.

15. The method of claim 14 wherein said powdered polymer is high density polyethylene.

16. The method of claim 14 wherein small, substantially spherical particles of said powdered polymer having particle diameters from 1 to about 20 microns are also included in said pigment-oil suspension at a concentration from 5 to about 35 weight percent.

17. The method of claim 1 wherein said powdered polymer comprises particles passing a 30 mesh screen.

18. The method of claim 17 wherein said powdered polymer particles have a size range passing a 30 to 35 mesh screen.

19. The method of claim 17 wherein said powdered polymer particles have a size range passing a 50 to 60 mesh screen.

* * * * *